US009173165B2

(12) United States Patent
Stark et al.

(10) Patent No.: US 9,173,165 B2
(45) Date of Patent: Oct. 27, 2015

(54) POWER SAVING FOR A COMMUNICATION DEVICE

(71) Applicant: CAMBRIDGE SILICON RADIO LIMITED, Cambridge (GB)

(72) Inventors: Jeremy Stark, Ely (GB); Jonathan Tyson Williams, Cambridge (GB); Peter Collins, Horningsea (GB); Peter Andrew Rees Williams, Cambridge (GB); Nick Jones, Cambridge (GB)

(73) Assignee: CAMBRIDGE SILICON RADIO LIMITED, Cambridge (GB)

( * ) Notice: Subject to any disclaimer, the term of this patent is extended or adjusted under 35 U.S.C. 154(b) by 145 days.

(21) Appl. No.: 13/736,924

(22) Filed: Jan. 8, 2013

(65) Prior Publication Data

US 2014/0192692 A1 Jul. 10, 2014

(51) Int. Cl.
*G08C 17/00* (2006.01)
*H04W 52/02* (2009.01)
*H04B 1/403* (2015.01)

(52) U.S. Cl.
CPC ........... *H04W 52/0209* (2013.01); *H04B 1/406* (2013.01); *Y02B 60/50* (2013.01)

(58) Field of Classification Search
None
See application file for complete search history.

(56) References Cited

U.S. PATENT DOCUMENTS

| 2007/0140220 | A1* | 6/2007 | Doradla et al. | 370/352 |
| 2009/0180451 | A1* | 7/2009 | Alpert et al. | 370/338 |
| 2011/0212746 | A1 | 9/2011 | Sarkar et al. | |
| 2012/0311176 | A1* | 12/2012 | Dellinger et al. | 709/232 |

FOREIGN PATENT DOCUMENTS

GB    2504541    2/2014

OTHER PUBLICATIONS

Search Report issued May 21, 2014 in corresponding GB1300298.5.

* cited by examiner

*Primary Examiner* — Kouroush Mohebbi
(74) *Attorney, Agent, or Firm* — Mahamedi Paradice LLP

(57) ABSTRACT

A communication device comprising: a first radio capable of communicating according to a first protocol and having a set of operational modes; and a second radio capable of communicating according to a second protocol, the communication device being configured to, in dependence on one or more communications by the second radio in accordance with the second protocol, selecting one mode of operation for the first radio from the set of operational modes, wherein said one or more communications comprises: sending a first message; and a response or non-response to the first message.

19 Claims, 2 Drawing Sheets

POWER SAVING FOR A COMMUNICATION DEVICE

TECHNICAL FIELD

This invention relates to a communications device. More particularly, the present invention relates to a communications device, network and method of optimizing the power saving in a wireless communications device.

BACKGROUND OF THE INVENTION

An increasing number of modern devices are capable of radio communication using multiple communication technologies. For example, many laptops, tablets, PDAs and smart phones are capable of communicating via Bluetooth and also via. IEEE 802.11 (WiFi). Such devices may be portable and may have to periodically scan network channels to detect an 802.11 access point (to which it can connect to) when the portable device moves from one area to another or moves outside of an 802.11 coverage area. As the portable device may have to constantly check if it is within an 802.11 coverage area using its radio transceiver, the power consumption of the portable device may substantially increase. Since the most portable devices are battery-powered, the reduction of the battery life can undercut the effectiveness of the true mobility of the portable device. If the user does not want the portable device to automatically scan the 802.11 coverage area, the user may have to manually select the 802.11 communication when he or she needs it. With this strategy, the use of the 802.11 capable devices is not automatic and not user-friendly.

There is therefore a need for a mechanism that allows a portable device to connect to a wireless network in a power efficient and user-friendly manner.

SUMMARY OF THE INVENTION

According to a first aspect of the disclosure there is provided a communication device comprising: a first radio capable of communicating according to a first protocol and having a set of operational modes; and a second radio capable of communicating according to a second protocol, the communication device being configured to, in dependence on one or more communications by the second radio in accordance with the second protocol, selecting one mode of operation for the first radio from the set of operational modes, wherein said one or more communications comprises: sending a first message; and a response or non-response to the first message.

Suitably, said communications may comprise: receiving a second message indicating a capability of communications according to the first protocol. Suitably, said second message may comprise an identifier of a radio capable of communicating according to the first protocol.

Suitably, the communication device may be configured to select, dependent on said second message, another radio capable of communicating according to the first protocol and establish a connection between the first radio and said selected radio. Suitably, the communication device may be configured to disable transmission and reception of communications by the first radio when the first radio is unable to connect to said selected radio.

Suitably, the communication device may be configured to periodically send said first message.

Suitably, the plurality of operational modes may comprise: an enabled mode configured to enable the transmission and reception of communications according to the first protocol; and a disabled mode configured to disable the transmission and reception of communications according to the first protocol. Suitably, the plurality of operational modes may further comprise at least on more of: a standby mode configured to disable the transmission and reception of communications according to the first protocol, the first radio being such that it consumes more power in the standby mode than in the disabled mode; a listening mode configured to disable the transmission of communications according to the first protocol and enable the reception of communications according to the first protocol; and a power saving mode configured to disable the transmission and/or reception of communications according to the first protocol for a predetermined length of time.

Suitably, the communication device may be configured to disable transmission and reception of communications by the first radio when the second radio is unable to connect to another radio in accordance with the second protocol.

Suitably, the first radio may be operable to perform wireless signalling at a first set of frequencies and the second radio being operable to perform wireless signalling at a second set of frequencies.

Suitably, the first and second radios may coexist at a single device.

Suitably, the first radio may support IEEE 802.11 communications. Suitably, the second radio may support Bluetooth communications.

Suitably, the communications by first radio may be such as to consume more power than communications by the second radio.

Suitably, the first radio may be capable of data transfer at rate greater than the rate of data transfer capable by the second radio.

Suitably, the communications device may be further configured to: determine a capability of communications according to the first protocol via the first radio; and send a second message indicating said determined capability via the second radio. Suitably, the communication device may be further configured to: enable the first radio so as to enable said capability determination; and in dependence of a threshold value, disable the first radio so as to disable said capability determination.

According to a second aspect of the disclosure there is provided a communications network comprising: a first communications device according to the communications device described above; a second communications device capable of communicating according to the first and second protocols; and a third communications device capable of communicating according to the first protocol, the second communications device being configured to: receive the first message; and in dependence of communications with the third communications device, send a second message indicating a capability of communications according to the first protocol to the first communications device.

According to a third aspect of the disclosure there is provided a method of selecting a mode of operation from a plurality of operational modes for a first radio of a first communications device, the first radio being capable of communicating according to a first protocol and the first communications device comprising a second radio capable of communicating according to a second protocol, the method comprising the steps of: the second radio sending a first message; and in dependence on a response or non-response to the first message, determining a mode of operation of the first radio.

Suitably, the method may further comprise the steps of, at a second communications device: receiving the first message; determining a capability of communications according to the first protocol; and sending a second message indicating a capability of communications according to the first protocol.

BRIEF DESCRIPTION OF THE DRAWINGS

The present invention will now be described by way of example with reference to the accompanying drawings, in which.

DESCRIPTION OF THE EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
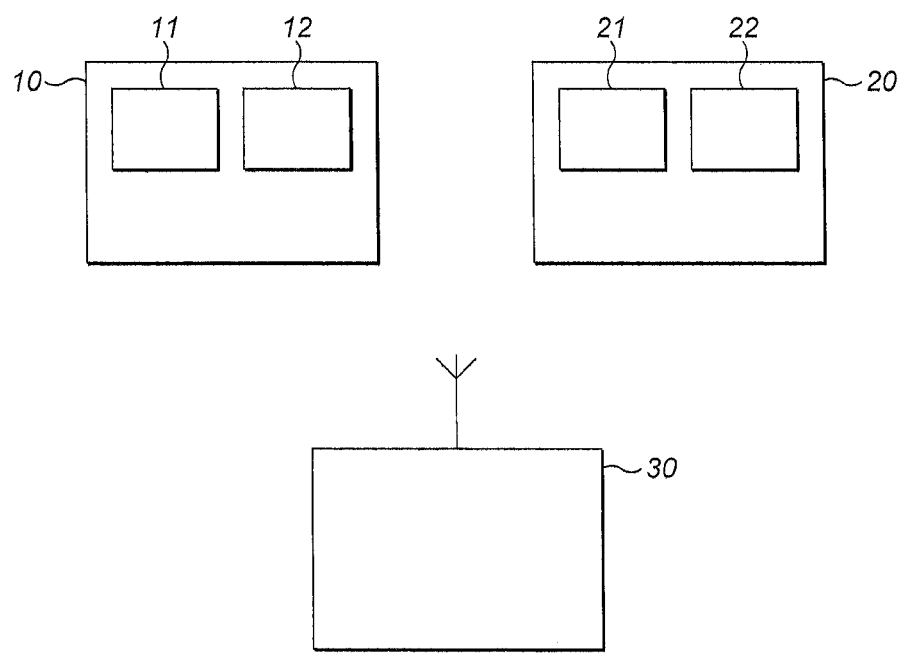
FIG. 1 shows a communications network.

FIG. 1 shows a communications network which comprises a first communications device 10, a second communications device 20 and an access point 30. The first and second communication devices 10, 20 may each comprise at least a first radio 11, 21 capable of communicating according to a first protocol and a second radio 12, 22 capable of communicating according to a second protocol. The first protocol may be a wireless communications protocol such as WiFi or LTE. The second protocol may be a wireless communications protocol such as Bluetooth, WiFi Direct or NFC. The access point 30 may be capable of communicating at least according to the first protocol. A radio operating according to the first protocol may have a higher power consumption compared to a radio operating according to the second protocol. For example, in the case of WiFi and Bluetooth, scanning and/or transmitting/receiving data by a WiFi radio can consume more power than scanning and/or transmitting/receiving data by a Bluetooth radio.

Typically, power is wasted by scanning for and maintaining unnecessary connections (for example, after a communication has finished). Minimising power consumption is an important consideration for mobile devices, particularly mobile devices that are used as telephones, such as "smart phones", where battery weight and size must be kept to a minimum to allow easy portability of such devices. Power consumption considerations may not so important for larger devices, such as laptops or computers.

The first communications device 10 may be a portable device, such as a smart phone. Such devices have a limited battery size and so limiting the power consumption is important. The second communications device 20 may be a portable device with a larger battery, such as a laptop. The power consumption for a laptop may be less important than that for a smart phone, for example. Alternatively, the first and second devices 10, 20 may be similar types of devices but with differing amounts of battery power remaining (e.g. the first device may have less battery power remaining than the second device). The following disclosure describes mechanisms so that that the first device 10 can save power and therefore extend its battery life. Also described are mechanisms so that both the first and second devices 10 and 20 can coordinate so that both devices can save power and therefore extend their battery life. It will be readily apparent to the skilled person that these mechanisms can be applied to more than two devices.

In the following example, the first device 10 is a smart phone, the second device 20 is a laptop, the third device 30 is a WiFi access point, the first protocol is a WiFi protocol and the second protocol is Bluetooth.

To save power, the smart phone 10 may have a default setting in which its WiFi radio 11 is off when it is not communicating with or is out of communications range with WiFi access point 30. When the WiFi radio 11 is on, but is out of range of the access point 30 that it can connect to, it periodically searches for access points that it can connect to. This consumes power and drains the smart phone 10 battery. Switching off the WiFi radio 11 so that it consumes no or very little power can save power and extend the battery life. However, by switching off the WiFi radio 11, it is unable to search for and connect to access point 30. This may lead to the smart phone 10 being unable to transfer data or the smart phone 10 using its cellular radio (not shown) to transfer data, which may be less power and/or cost efficient than transferring data via WiFi.

The smart phone 10 can comprise a Bluetooth radio 12. The Bluetooth radio 12 can be capable of searching for and connecting to other Bluetooth radios and consume less power to do so than WiFi radios. Bluetooth radios capable of operating according to the Bluetooth low energy (BTLE) protocol (which is defined in the Bluetooth specification v4.0) are capable of consuming even less power and BTLE radios may be preferred for certain applications. Access point 30 may not be capable of communicating according to the Bluetooth protocol. Thus smart phone 10 may not be able to transfer data or connect the internet via the access point 30. Laptop 20, however, may comprise a Bluetooth radio 22 and a WiFi radio 21. Thus the smart phone 10 may be able communicate with the laptop 20 via Bluetooth.

The Bluetooth radio 12 of the smart phone 10 may periodically poll (for example, every 10 seconds) for another Bluetooth radio in order to establish a Bluetooth connection. If the smart phone 10 is within range of the laptop 20, a Bluetooth connection may be established between the Bluetooth radio 12 of smart phone 10 and the Bluetooth radio 22 of laptop 20. When a Bluetooth connection has been established, the smart phone 10 may inquire via Bluetooth about any WiFi access points that the laptop 20 may be connected to or any access points that the laptop 20 is aware of. The WiFi radio 21 of the laptop 20 may be connected to access point 30 or may be capable of detecting access point 30 (e.g. the WiFi radio 21 may be capable of receiving a beacon from access point 30, wherein the beacon comprises an identifier for the access point 30). In response to the inquiry from the smart phone 10, the laptop 20 can send a message to the smart phone 10 via the Bluetooth radios 22 and 12.

Depending on the message received, the smart phone 10 may change the mode of operation for its WiFi radio 11. For example, if the laptop 20 was connected to or has detected the access point 30, the laptop 20 may generate a message that indicates the presence of the access point 30. Preferably, the message may also comprise an identifier of the access point 30 (such as its SSID). The laptop may then send the message to the smart phone 10 via Bluetooth. The smart phone 10 can analyse the message to determine the presence of a WiFi access point 30. The smart phone 10 may now know that there may be a suitable WiFi access point 30 to connect to and may then turn on its WiFi radio 11 to establish a WiFi connection. If the WiFi radio 11 of the smart phone is unable to detect the access point or establish a connection with the access point via its WiFi radio 11, then the smart phone 10 may switch off its WiFi radio 11.

The laptop 20 may be configured to advertise, via the Bluetooth radio 22, the identity of the access point 30 (such as the SSID) that it is connected to or has detected. Thus, the smart phone 10 may be able to determine the identity of the access point 30 without establishing a Bluetooth connection via radios 12 and 22.

As mentioned above, the message sent by the laptop 20 to the smart phone 10, may comprise an identifier of the access point 30. The smart phone 10 may analyse the identifier to determine if the smart phone 10 has previously been connected to access point 30. If the access point 30 is known to the smart phone 10 (e.g. by storing its SSID and/or any associated access password such as a WEP/WPA key), then the smart phone 10 may power on its WiFi radio 11 to establish a WiFi connection with the access point 30. If the message identifies an access point that the smart phone 10 is not aware of or has established a previous connection to, then the smart phone 10 may determine that the WiFi radio 11 remains off. If the laptop 20 detects more than one WiFi access point, then the message sent by the laptop may comprise a plurality of identifiers, one identifier for each detected access point. The message may be sent via one or more Bluetooth data packets.

The message sent by the laptop via Bluetooth may additionally comprise an indication of the security level of the access point. For example, the message may indicate that the access point is open and does not require a password or key to establish a connection or the message may indicate that the access point is closed and has some form of encryption (such as WPA/EWP) and requires a password or key to establish a connection. If the access point is not known to the smart phone and is indicated as open, on receiving the message, the smart phone may determine whether or not to power on its WiFi radio and establish a connection with the open access point depending on user preference.

As mentioned above, the Bluetooth radio 12 of the smart phone 10 periodically polls for another Bluetooth device when its WiFi radio 11 is off. If there is no other Bluetooth device within range of the smart phone 10, the Bluetooth radio 12 may not receive a response to the polls. In this case, the smart phone 10 determines that there may not be any suitable WiFi access points to connect to and determines that the WiFi radio 11 remains off, thus saving power. The smart phone 10 may also determine that the WiFi radio 11 remains off if the Bluetooth radio 12 receives a response to the polls from an unsuitable source. Such a source may be another Bluetooth device that does not have WiFi capability and is therefore unable to determine if there are any suitable WiFi access points to connect to.

Alternatively to the message comprising an identifier of the access point, the message from the laptop 20 may indicate to the smart phone 10 that its WiFi radio should be switched on. The laptop 20 may comprise a list of devices that are associated with the access point 30 and/or have permission to use the access point 30. In response to the inquiry sent by the smart phone 10, the laptop 20 may analyse the list of devices to determine if the smart phone is associated with the access point 30 and/or has permission to connect to the access point 30. If the determination is positive, then the laptop 20 can respond via Bluetooth to the inquiry with a message that indicates that the smart phone 10 should power on its WiFi radio 11. Such a message may not require the identity if the access point 30 to be sent and thus the message can be small in size. This may be particularly useful for devices with second radios 12, 22 that have a low data transfer rate (such as BTLE and NFC).

When the smart phone 10 determines that its WiFi radio 11 should be switched on, a WiFi connection can be established between the smart phone 10 and the access point 30. In response to the smart phone 10 determining that its WiFi radio 11 should be switched on, the smart phone 10 may stop polling for a Bluetooth connection and/or power down its Bluetooth radio 12. When the WiFi connection is established, the WiFi radio 11 of the smart phone 10 may transmit and/or receive data from the internet via the access point 30. If the WiFi connection drops (e.g. due to the smart phone 10 moving out of range or due to a failure at the access point 30), then the smart phone 10 may automatically power down its WiFi radio 11 to save battery power. The Bluetooth radio 12 then begins polling for Bluetooth devices in order to inquire about available WiFi access points.

The WiFi radios 11, 21 may be capable of operating according to a number of modes. For example, these modes may include, and are not limited to:

a) Disabled mode: in this mode, the radio is powered off and therefore it is not able to transmit or receive data. The only power consumption may be a small leakage current.

b) Enabled mode: in this mode, the radio is on and is able to transmit and receive data at its maximal rate. The power consumption is greatest when the radio is actively transmitting/receiving data in this mode.

c) Standby mode: in this mode, the radio is not able to transmit and/or receive data, but is able to wake and power on quickly to be able to transmit and/or receive data. The radio may consume a small amount of power (which may be greater than the leakage current in the disabled mode).

d) Listening mode: in this mode, the radio may listen for a packet to arrive, so most of the radio receiver may be on and the transmitter may be powered down.

e) Power saving mode: in this mode, the radio may go into the standby mode for a predetermined length of time in order to save power. The radio announces its intention to enter the power saving mode by informing the access point that the radio wants to power down everything except a timer. The timer is able to control when the radio powers back up to receive traffic from the access point.

The smart phone 10 may determine an appropriate operational mode for the WiFi radio 11. For example, if the WiFi radio 11 is in the enabled mode and then loses connection to the access point, the smart phone 10 may select a standby mode instead of the disabled mode so that it may quickly connect to the access point 30 if the Bluetooth radio 11 is able to determine (using the above-described process) that there is an available access point. Then after some time, if the Bluetooth radio 11 is unable determine if there is an available access point (e.g. because there are no responses to its polls), then the smart phone 10 may switch the mode from standby to disabled so as to save more power. In another example, if the smart phone 10 determines, via the Bluetooth radio 12, that there is an available access point, and the smart phone 10 also determines that its battery power is low (i.e. below a threshold power level) then the smart phone 10 may establish a connection to the access point and select a power saving mode instead of the enabled mode to extend the available battery life.

Figure 2:
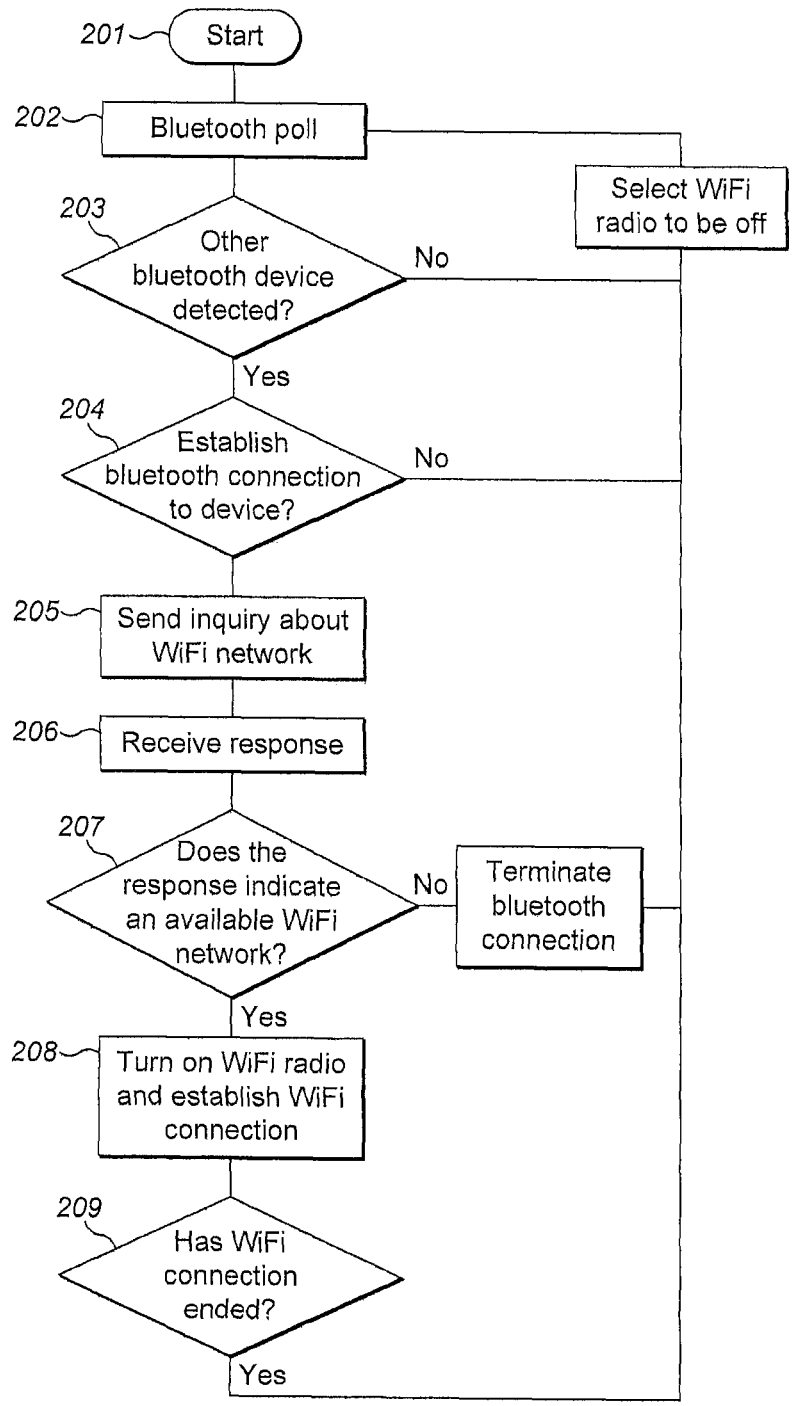
FIG. 2 shows a process for connecting to a network.

FIG. 2 diagrammatically shows an exemplary process that can be carried out by the smart phone for establishing and pulling down a WiFi connection in a power efficient manner.

At 201, the process begins. The WiFi radio may be turned off at the start of the process.

At step 202, the Bluetooth radio polls for establishing a Bluetooth connection with another Bluetooth device.

At step 203, if no other Bluetooth devices are detected, the WiFi radio remains off and the process returns to step 202. If another Bluetooth device is detected, the process moves on to step 204.

At step 204, if a Bluetooth connection is unable to be established with the Bluetooth device, then the WiFi radio remains off and the process returns to step 202 to look for other Bluetooth devices. If a Bluetooth connection is established, the process moves on to step 205.

At step 205, via the Bluetooth connection, the smart phone inquires about a WiFi network.

At step 206, the smart phone receives a response to the inquiry.

At step 207, the smart phone determines if the response indicates an available WiFi network. If the response does not indicate an available WiFi network, the WiFi radio remains off, the Bluetooth connection is terminated and the process returns to step 202 to look for other Bluetooth devices. If the smart phone receives a message that indicates an available WiFi network, the process moves on to step 208. An indication that the WiFi network is available to the smart phone may be an SSID of the access point that matches the SSID of an access point that the smart phone has previously connected to.

At step 208, the smart phone turns on the WiFi radio and established a WiFi connection to the WiFi network.

At step 209, if the WiFi connection drops, the WiFi radio is powered down and the process returns to step 202.

The smart phone may carry out the above process to save power. The process may be initiated, for example, by default, upon selection of a setting by the user or when the remaining battery power reaches a threshold value.

The first and second radios 11, 12 or 21, 22 for communication device 10 and/or communication device 20 (e.g. the smart phone 10 and/or laptop 20) may be co-located or integrated into a single package or monolithic device. The first and second radios 11, 12 or 21, 22 may share memory (not shown), which may enable the first and second radios 11, 12 or 21, 22 to share information. For example, in the examples given above, the Bluetooth radio 22 of the laptop 20 may be able to determine the SSID of the access point 30 (and other credentials such as any security settings) by reading the memory that it shares with the WiFi radio 21. Alternatively, the WiFi radio 21 may send a message (e.g. via a bus or a direct wired connection) to the Bluetooth radio 22 that enables the Bluetooth radio 22 to determine the SSID of the access point 30 (and any other credentials).

The first and second communications devices 10 and 20 may coordinate with each other such that each device may save power. For example, the first device 10 may enable its first radio 11 so as to determine any capability of communications according to the first protocol (e.g. scanning for a WiFi access point). If there is no capability (e.g. no WiFi access point within range), then the first communications device 10 can continue to scan using its first radio 11. However, as mentioned above, this can lead to an increase in power consumption for the first communication device 10. In dependence of some threshold value or trigger (e.g. a value based on time, battery power or signal strength or a random allocation) the first communication device 10 may disable its first radio 11 in order to save power. The second communications device 20 may then enable its first radio 21 so as to determine any capability of communications according to the first protocol (e.g. scanning for a WiFi access point). In this manner, the first and second communication devices 10 and 20 can take turns to perform scans to determine if there is an available access point. The second radios for each device 12 and 22 may enable the devices 10 and 20 to exchange information. For example, if the first device determines an available access point, the second radios 12, 22 can be used to send a message (e.g. comprising an identifier, as described above) from the first device to the second device that causes the second device enable its first radio 21 for connection to the access point 30. Information can be exchanged between the second radios 12, 22 so as to determine which device is to perform scanning with its first radio. E.g. if the first device 10 is performing scanning using its first radio 11 and its battery power drops below a threshold value, then it can disable its first radio 11 and, via the second radios 12 and 22, it can request that the second device 20 performs the scanning operation on its first radio 21. This coordinated scanning technique can be distributed among many devices (e.g. greater than two) to help save even more power as only one device among the many will be performing the scanning at any one time.

In another example, the radios 11, 12, 21 and 22 may be separate communications support entities that can provide connections to separate communications networks using compatible communications technologies. For example, communication support entities 11 and 21 may each support a WiFi connection to an access point and communication support entities 12 and 22 may each support and enable a WiFi Direct connection between the first and second communication devices. The WiFi Direct support entities 12, 22 may be capable of operating in a lower power mode than the WiFi support entities 11 and 21 and thus the first and/or second communications devices 10 and/or 20 can reduce their power consumption utilising the power saving techniques disclosed herein.

The embodiments described herein are merely exemplary and it will be understood by the skilled person that the communication devices may support communication protocols other than Wi-Fi and Bluetooth.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A first communication device comprising:
   a first radio capable of communicating according to a first protocol and having a set of operational modes; and
   a second radio capable of communicating according to a second protocol,
   the first communication device being configured to: (i) send via the second radio a first message according to the second protocol to a second communication device; (ii) in response to the first message, receive via the second radio a second message according to the second protocol, the second message indicating a capability of communications according to the first protocol between the first communication device and a third communication device; and (iii) select one mode of operation for the first radio from the set of operational modes in response to the receipt of the second message via the second radio.

2. The first communication device according to claim 1, said second message comprising an identifier of a radio of the third communication device capable of communicating according to the first protocol.

3. The first communication device of claim 1, the first communication device being configured to select, dependent on said second message, another radio capable of communicating according to the first protocol and establish a connection between the first radio and said selected radio.

4. The first communication device of claim 3, the first communication device being configured to disable transmission and reception of communications by the first radio when the first radio is unable to connect to said selected radio.

5. The first communication device of claim 1, the first communication device being configured to periodically send said first message.

6. The first communication device of claim 1, the plurality of operational modes comprises:
    an enabled mode configured to enable the transmission and reception of communications according to the first protocol; and
    a disabled mode configured to disable the transmission and reception of communications according to the first protocol.

7. The first communication device of claim 6, the plurality of operational modes further comprising at least one more of:
    a standby mode configured to disable the transmission and reception of communications according to the first protocol, the first radio being such that it consumes more power in the standby mode than in the disabled mode;
    a listening mode configured to disable the transmission of communications according to the first protocol and enable the reception of communications according to the first protocol; and
    a power saving mode configured to disable the transmission and/or reception of communications according to the first protocol for a predetermined length of time.

8. The first communication device of claim 1, the first communication device being configured to disable transmission and reception of communications by the first radio when the second radio is unable to connect to another radio in accordance with the second protocol.

9. The first communication device of claim 1, the first radio being operable to perform wireless signalling at a first set of frequencies and the second radio being operable to perform wireless signalling at a second set of frequencies.

10. The first communications device of claim 1, wherein the first and second radios coexist at a single device.

11. The first communications device of claim 1, wherein the first radio supports IEEE 802.11 communications.

12. The first communications device of claim 1, wherein the second radio supports Bluetooth communications.

13. The first communications device of claim 1, the communications by the first radio being such as to consume more power than communications by the second radio.

14. The first communications device of claim 1, the first radio being capable of data transfer at rate greater than the rate of data transfer capable by the second radio.

15. The first communications device of claim 1 further configured to:
    determine a capability of communications according to the first protocol via the first radio; and
    send a second message indicating said determined capability via the second radio.

16. The first communications device of claim of 15 further configured to:
    enable the first radio so as to enable said capability determination; and
    in dependence of a threshold value, disable the first radio so as to disable said capability determination.

17. A communications network comprising:
    a first communications device according to the first communication device of claim 1;
    a second communications device capable of communicating according to the first and second protocols; and
    a third communications device capable of communicating according to the first protocol, the second communications device being configured to:
    receive the first message; and
    in dependence of communications with the third communications device, send a second message to the first communications device indicating a capability of communications according to the first protocol between the first communications device and the third communications device.

18. A method of selecting a mode of operation from a plurality of operational modes for a first radio of a first communications device, the first radio being capable of communicating according to a first protocol and the first communications device comprising a second radio capable of communicating according to a second protocol, the method comprising the steps of:
    the second radio sending a first message according to the second protocol to a second communications device;
    in response to the first message, the second radio receiving a second message according to the second protocol, the second message indicating a capability of communications according to the first protocol between the first communications device and a third communications device; and
    in dependence on the second message, determining a mode of operation of the first radio.

19. The method of claim 18, further comprising the steps of, at the second communications device:
    receiving the first message;
    determining a capability of communications according to the first protocol between the first communications device and the third communications device; and
    sending the second message indicating the capability of communications according to the first protocol between the first communications device and the third communications device.

* * * * *